United States Patent [19]

Long et al.

[11] Patent Number: 4,827,806
[45] Date of Patent: May 9, 1989

[54] LOGIC VALVING FOR A TRANSMISSION CONTROL

[75] Inventors: Charles F. Long, Indianapolis; Phillip F. McCauley, Danville; Robert C. Boyer, Greenwood, all of Ind.

[73] Assignee: General Motors Corporation, Detroit, Mich.

[21] Appl. No.: 230,935

[22] Filed: Aug. 11, 1988

[51] Int. Cl.⁴ .............................................. B60K 41/06
[52] U.S. Cl. ......................................... 74/869; 74/861
[58] Field of Search ................. 74/865, 866, 867, 868, 74/869, 877, 861

[56]                    References Cited
              U.S. PATENT DOCUMENTS

| | | | |
|---|---|---|---|
| 3,937,108 | 2/1976 | Will | 74/869 X |
| 4,345,489 | 8/1982 | Muller et al. | 74/866 X |
| 4,414,863 | 11/1983 | Heino | 74/866 |
| 4,494,423 | 1/1985 | McCarthy et al. | 74/868 X |
| 4,628,772 | 12/1986 | Nishikawa et al. | 74/869 X |

FOREIGN PATENT DOCUMENTS 60-256653  12/1985  Japan ..................................... 74/861
60-256655  12/1985  Japan ..................................... 74/861

Primary Examiner—Dwight G. Diehl
Attorney, Agent, or Firm—Donald F. Scherer

[57]                       ABSTRACT

A transmission control has a plurality of solenoid controlled hydraulic valves that are selectively operable to control the establishment of various drive ratios in a six speed transmission. A logic valve, comprised of two spool valves and a solenoid, is disposed between the solenoid controlled hydraulic valves and some of the friction drives in the transmission which establish the various drive ratios. The logic valves are operable to establish the fourth ratio if an electrical malfunction occurs during operation in the fourth or fifth ratios, or to establish the fifth ratio if electrical malfunction occurs while operating in the sixth ratio, or to establish the third ratio if an electrical malfunction occurs while operating in the first, second or third forward speed ratios. In the alternative, the logic valves can be controlled to establish fourth ratio whenever an electrical malfunction occurs when the transmission is operating in the second through fifth ratios.

4 Claims, 3 Drawing Sheets

LOGIC VALVING FOR A TRANSMISSION CONTROL

BACKGROUND OF THE INVENTION

This invention relates to transmission controls for multispeed transmissions, and more particularly to electro-hydraulic controls, wherein valving members are incorporated to selectively establish a predetermined speed ratio in a transmission if an electrical malfunction occurs.

The use of electro-hydraulic controls for multispeed transmissions is becoming more wide spread. When these controls are installed in a six speed automatic transmission, it is common practice to have the transmission be selectively conditioned for the fourth speed ratio if unwanted electrical discontinuance should occur. Such devices have been generally satisfactory. However, there are some conditions under which a shift to the fourth speed ratio may not be desired. For example, when operating in either the lowest speed ratio or highest speed ratio, a shift to the fourth speed ratio may result in less tractive effort than required, or more engine speed than desired, respectively.

To prevent the transmission from shifting from the sixth ratio to the fourth ratio, corresponding U.S. application Ser. No. 230,938, filed Aug. 11, 1988, utilizes an inhibitor valve to prevent shifting from the sixth ratio to the fourth ratio if an electrical malfunction occurs. Another device disclosed in co-pending U.S. application Ser. No. 230,813, filed Aug. 11, 1988, incorporates a manual valve in the control mechanism to permit the operator to manually select and establish forward, low, reverse and neutral speed ratios in the transmission if an electrical malfunction should occur. Both of these solutions are satisfactory and will accomplish the intended purpose of the devices; that is, a "limp home" feature is incorporated into the transmission.

SUMMARY OF THE INVENTION

The present invention provides for the transmission to be conditioned for three forward ratios, dependent upon the operating condition of the transmission if an electrical malfunction should occur. If the transmission is operating in the first forward ratio when the electrical power is discontinued because a malfunction occurs, the third speed ratio will be established by a pair of logic valves.

If the transmission is operating in the second through fifth ratios, the fourth ratio will be established by the logic valves and if the transmission is operating in the sixth speed ratio, the fifth speed ratio will be established by the logic valves. In the alternative, the logic valves can be operated to permit the third forward ratio to be established if an electrical malfunction occurs during the second or third forward speed ratio.

This schedule of electrical power off operating conditions will provide a broad range of ratio coverage if an electrical malfunction occurs. The third ratio will provide sufficient travel effort for "limp home" if the vehicle was in the low ratio prior to electrical power off. The fourth ratio provides satisfactory overall performance while the change from sixth to fifth will not result in an engine overspeed but will permit satisfactory maximum vehicle speed until repairs can be made to the transmission control.

The present invention accomplishes this by incorporating two logic valves into an electro-hydraulic control system. Both valves are controlled during normal operating by a forward solenoid that is energized during a shift from the neutral to forward drive. One of the valves is shifted by a control pressure upon a neutral to forward drive or reverse drive while the other is maintained unshifted by pressure acting on the valve to lock its position in first forward speed ratio. The second logic valve will be shifted by the control pressure during normal operation when the transmission shifts from the low or first speed ratio to the second speed ratio as allowed by the pressure locked valve being dropped.

Both logic valves have a latch area which is pressurized by the fluid in the passages that supply the two friction devices for established the fourth speed ratio. If the valves are in the latch position and a power off malfunction should occur, the valves will remain latched. The transmission shift sequence is such that at least one valve is latched to the shifted position whenever a forward drive has been selected. In the fourth ratio, both valves are latched in the shifted position. In the sixth speed ratio, the forward solenoid is deenergized and one of the logic valves is unlatched and moved to the unshifted position by a spring force.

The solenoids, in the transmission control, for controlling the friction devices which establish the fourth speed ratio are normally open such that the shift valves controlled thereby will be operable to distribute pressurized fluid to the logic valves if an electrical power discontinuance should occur and the control pump continues to supply fluid pressure. The logic valves will distribute the fluid pressure to the various friction devices depending upon their respective latched or unlatched condition during the electrical malfunction.

It is therefore an object of this invention to provide an improved electro-hydraulic control valve for a multispeed transmission wherein a pair of logic valves are operable upon an electrical discontinuance to establish the friction devices of the transmission for one of three operating conditions, depending upon the speed ratio selected prior to the discontinuance.

It is another object of this invention to provide an improved electro-hydraulic control for the power transmission having at least six forward speed ratios established by selectively engageable friction devices, wherein the control includes a pair of logic valves which are operable on the discontinuance of electrical power to the control to establish the third speed ratio if the transmission was in first, second or third speed ratio prior to the discontinuance, and fourth speed ratio if the transmission was in the fourth or fifth speed ratio prior to the discontinuance, and the fifth speed ratio if the transmission was operating in the sixth speed ratio prior to the discontinuance.

It is a further object of this invention to provide an improved electro-hydraulic control for a multispeed transmission having a plurality of speed ratios established by selectively operable fluid engaged friction devices, wherein the electro-hydraulic control has a logic valve including a pair of spool valves that are operable to selectively direct fluid to the friction devices during an electrical malfunction to cause the transmission to be maintained in one of three forward speed ratios dependent upon the forward speed ratio established immediately prior to the malfunction.

These and other objects and advantages of the invention will be more readily apparent from the following description and drawings.

DESCRIPTION OF AN EXEMPLARY EMBODIMENT

Figure 1:
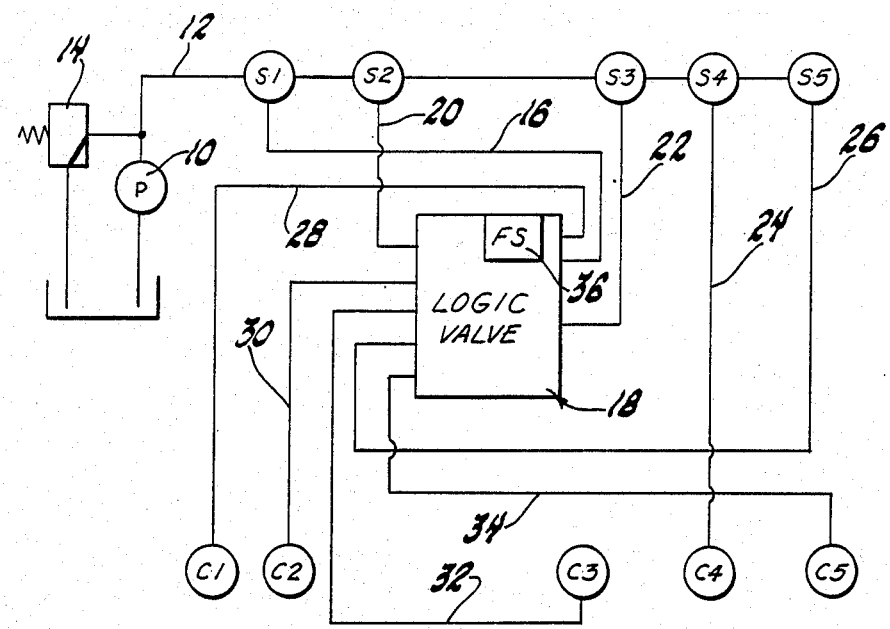
FIG. 1 is a schematic representation of an electro-hydraulic control including the shift valves, a logic valve and friction devices for a multispeed transmission.

Referring to the drawings, wherein like characters represent the same or corresponding parts throughout the several views, there is seen in FIG. 1 a schematic representation of an electro-hydraulic transmission control, including a conventional engine driven pump 10 which supplies pressurized fluid to a passage 12. The pressure in the passage 12 is established by a conventional regulator valve 14. The passage 12 is in fluid communication with a plurality of solenoid operated shift valves denoted S1 through S5.

The shift valves S1 and S2 are both normally open valves, that is, whenever the solenoid of the valve is deenergized, the valve will pass high pressure fluid if the pump 10 is operating. Solenoid S1 is operable to control the distribution of fluid to a C1 feed passage 16 which is connected with a logic valve 18. The solenoid valve S2 is operable to control fluid pressure distribution to a C2 feed passage 20 which is connected to the logic valve 18.

The solenoid valve S3 controls fluid pressure in a C3 feed passage 22 which is connected with the logic valve 18. The solenoid shift valve S4 controls fluid pressure in a C4 apply passage 24 which is in fluid communication with a selectively engageable fluid operated friction device disposed in a conventional transmission. The solenoid shift valve S5 is operable to control fluid pressure in a C5 feed passage 26 which is in fluid communication with the logic valve 18. The logic valve 18 is operable to control fluid pressure distribution to a C1 apply passage 28, a C2 apply passage 30, a C3 apply passage 32 and a C5 apply passage 34. The logic valve 18 also has a forward solenoid 36 which, as seen in FIGS. 2 through 5, is operable to control fluid pressure in a feed control chamber passage 38.

The friction device C1 through C5 may be incorporated in a multispeed planetary transmission, such as that shown in U.S. Pat. No. 4,070,927 to Polak, issued Jan. 31, 1978, and assigned to the assignee of the present application. In the transmission described in Polak, the C1 device is a clutch which is energized during first, second, third and fourth speed ratios; friction device C2 is a clutch which is engaged during fourth, fifth and sixth forward speed ratios; friction device C3 is a fluid operated friction brake which is engaged during third and fifth forward speed ratios; and the reverse speed ratio, C4, is a friction device which is engaged during the second and sixth forward speed ratios. C5 is a fluid operated friction brake which is energized during first, reverse and neutral.

The logic valve 18 is seen diagrammatically in FIGS. 2 through 5. This valve includes a valve body 40 in which is formed a pair of step diameter valve bores 42 and 44. A valve spool 46 is slidably disposed in the valve bore 42 and has formed thereon four equal diameter lands 48, 50, 52 and 54, and a smaller diameter land 56.

The differential area between lands 54 and 56 cooperate to form a latch area, the purpose of which will be described later. The valve land 48 has formed therein a spring pocket 58 in which is disposed a compression spring 60 which is maintained in the valve bore 42 by a plug 62. Plug 62 and valve land 48 cooperate to form a C5 hold chamber 64 which is in fluid communication through a passage 66 formed in the valve spool 46 between lands 48 and 50.

Figure 2:
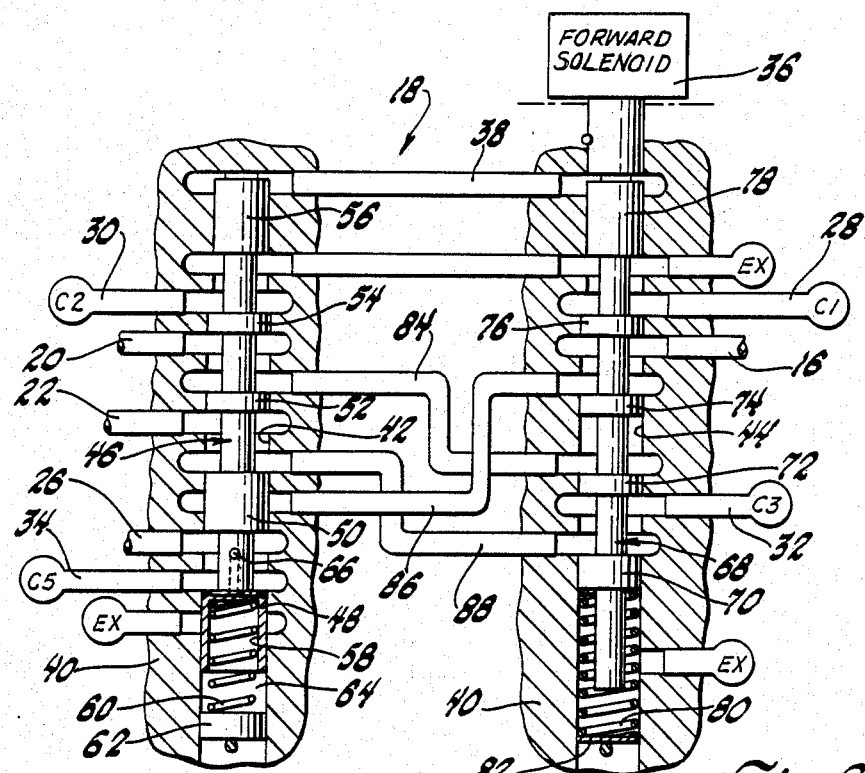
FIG. 2 is a diagrammatic representation of the logic valve conditioned for neutral transmission operation.

As seen in FIG. 2, the passage 66 is in fluid communication with the C5 feed passage 26 when the valve spool 46 in the spring set position shown. Since the C5 feed passage 26 is pressurized during neutral, the valve spool 46 will be maintained upwardly by both the spring 60 and the pressure in the friction device C5.

The logic valve 18 has a second spool valve 68 which is slidably disposed in the stepped diameter valve bore 44 and has formed thereon equal diameter lands 70, 72, 74 and 76, and a small diameter land 78. The small diameter land 78 and land 76 have a differential area therebetween which forms a latch area, the function of which will be described later.

The valve spool 68 is maintained in the spring set position shown by a compression spring 80 which is disposed between a spring seat 82 and one side of valve land 70. Each of the valve spools 46 and 68 are in fluid communication with the passage 38 such that the ends of lands 56 and 78, respectively, will be subjected to control fluid pressure whenever the solenoid 36 is energized.

Figure 3:
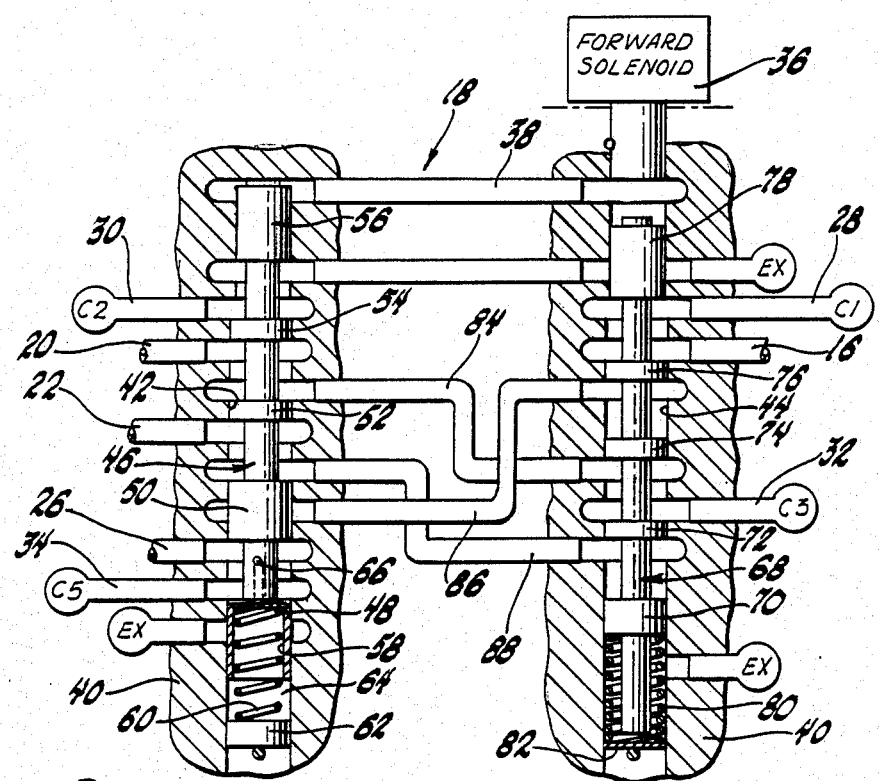
FIG. 3 is a view similar to FIG. 2 with the logic valve conditioned for the first forward speed operation.

As seen in FIG. 3, which represents the logic valves being conditioned for the first forward speed operation, the valve spool 68 is held downward against the spring 80 while the valve spool 46 is maintained in the upward or spring set position. The valve spool 68 is urged to the pressure set position shown by fluid pressure in the passage 38 due to energization of the solenoid 36. The valve spool 46 is maintained upwardly in the spring set position shown, due to fluid pressure in the C5 feed passage 26 passing between lands 50 and 48 to the C5 apply passage 34. The pressure between the lands 48 and 50 is communicated through the passage 66 to the chamber 64.

During first forward speed ratio operation, the C1 feed passage 16 is pressurized and since the valve spool 68 is in the pressure set position, the C1 feed passage 28 is pressurized by fluid pressure passing between the lands 76 and 78 of valve spool 68.

As mentioned above, the area of valve land 78 is less than the area of valve land 76. The fluid pressure distributed between these valve lands acts on this differential area and will maintain the valve spool 68 in the pressure set position if the fluid pressure in passage 38 should be discontinued due to deactuation of the solenoid 36.

During the first forward speed operation in the transmission, the remaining friction devices C2, C3 and C4 are deenergized. On an upshift from the first ratio to the second ratio, the C5 feed passage 26 is exhausted whereby the fluid pressure in passage 38 will cause the valve spool 46 to assume the pressure set position shown in FIG. 4. In the second forward speed ratio, the solenoid shift valve S4 is energized while the solenoid shift valve S5 is being deenergized, thus effectively interchanging the friction devices C4 and C5.

Figure 4:
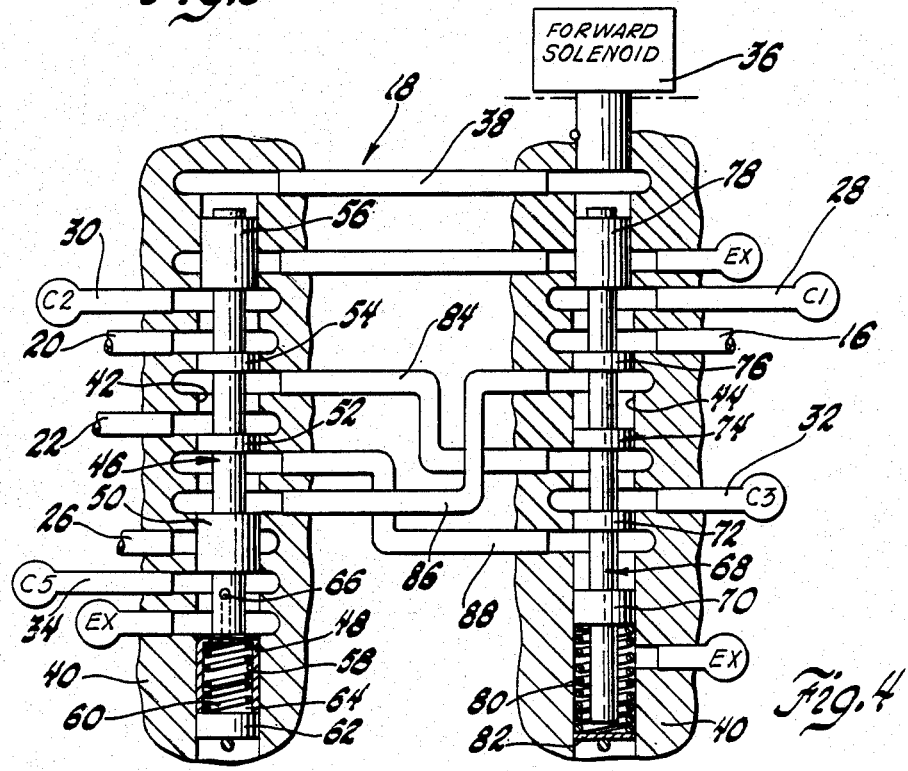
FIG. 4 is a view similar to FIG. 2 with the logic valve conditioned for any of the second through fifth speed ratios.

During the second forward speed ratio, the remaining devices, except C1, are exhausted. To condition the transmission for the third forward speed ratio, the shift valve S4 is conditioned to exhaust apply passage 24 and the shift valve S3 is conditioned to pressurize feed passage 22. As seen in FIG. 4, feed passage 22 is connected between lands 54 and 52 with an interconnecting passage 84. The interconnecting passage 84 is in fluid communication between valve lands 72 and 74 with the apply passage 32 and the friction device C3 which is energized during the third forward speed.

To condition the transmission for the fourth forward speed, the shift valve S2 is controlled to pressurize the C2 feed passage 20. As described above, the solenoid valve S2 is a normally open valve, therefore, during pressurization of the apply feed passage 20, the solenoid valve S2 is deenergized. As the solenoid valve S2 is deenergized, the solenoid valve S3 is also deenergized, thus exhausting passage 22. The passage 20 is connected between the valve lands 54 and 56 with the C2 apply passage 30. As described above, the valve lands 54 and 56 have a differential area therebetween which cooperates with the fluid pressure in passage 20 to latch the valve spool 46 in the pressure set position shown. In the fourth forward speed range, both friction devices C1 and C4 are energized and therefore the latch areas of both spool valves are energized.

To condition the transmission for the fifth forward speed ratio, the solenoid valve S1 is energized thereby exhausting the C1 feed passage 16 which effective exhausts the C1 apply passage 28. Also, during the ratio interchange from the fourth to the fifth ratio, the C3 feed passage 22 is pressurized which, as described above for the third forward speed operation, pressurizes the C3 feed passage 32 through the interconnection of the valve spools 46 and 68.

To condition the transmission for the sixth forward speed ratio, the solenoid valve S4 is energized, thereby engaging the friction brake C4 while the solenoid valve S3 is deenergized thereby disengaging the friction brake C3. Also during this shift interchange from fifth to sixth or after the sixth speed ratio has been established, the solenoid 36 is deenergized, thereby exhausting passage 38. With passage 38 exhausted and with the S1 feed passage 16 exhausted, the valve spool 68 will assume the spring set position shown in FIG. 5. However, the valve spool 46 will remain in the pressure set position because the pressure in the C2 speed passage 20 continues to operate on the latch are between lands 54 and 56.

Figure 5:
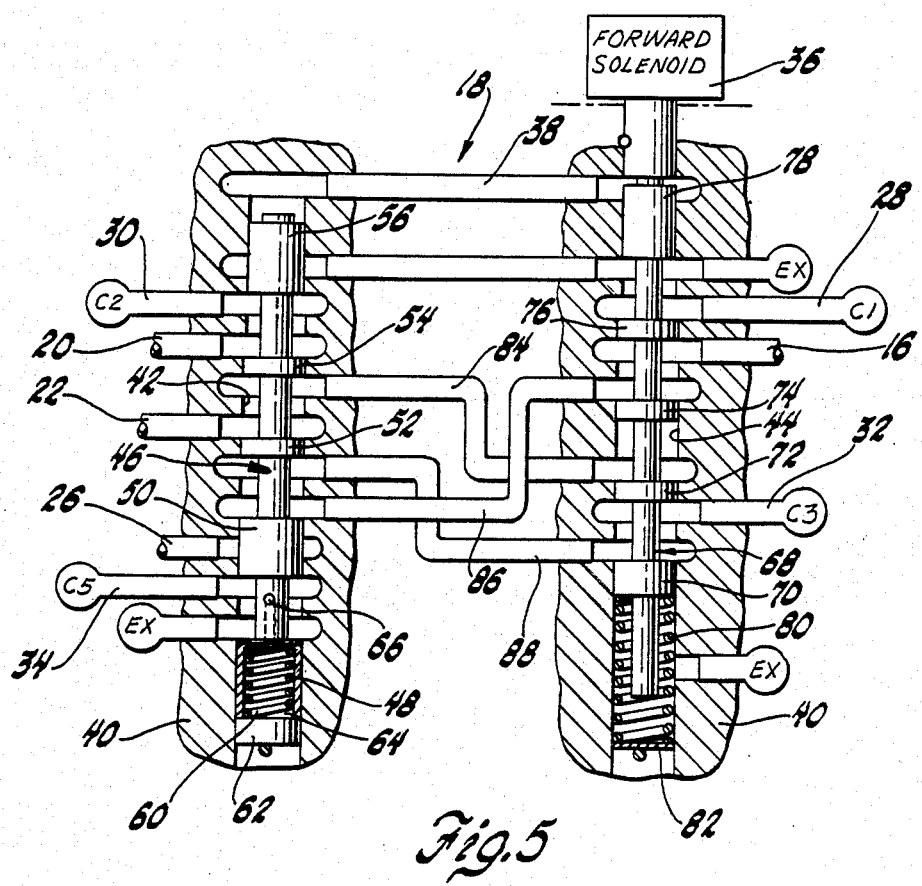
FIG. 5 is a view similar to FIG. 2 with the logic valve conditioned for the sixth forward speed ratio.

If during operation in the sixth forward speed ratio with the spool valves 68 and 46 conditioned, as shown in FIG. 5, an electrical malfunction should occur, all the solenoid valves will be deenergized. Since the solenoid valve S2 was deenergized prior to the malfunction, the valve spool 46 will remain in the latched position. When the solenoid valve S1 is deenergized, the C1 forward passage 16 will be pressurized.

With the valve spool 68 in the position shown, solenoid pressure in passage 16 will be distributed between lands 76 and 74 to an interconnecting passage 86 which, in turn, is connected between lands 50 and 52 to an interconnecting passage 88. The interconnecting passage 88 is in fluid communication between lands 70 and 72 with the C3 apply passage 32 which, as described above, will energize the friction device C3.

The friction device C2 will remain energized and therefore the transmission will operate in the fifth forward speed ratio until the pump 10 discontinues operation. This will permit the operator to drive the vehicle to a repair station save the need for a towing vehicle to come to retrieve the disabled vehicle.

As seen in FIG. 3, if an electrical malfunction should occur, the valve spool 68 will be retained in the position shown because of the pressurization of the latch area. The C2 feed passage 20 will be pressurized on electrical malfunction and the pressure therein will be distributed between lands 52 and 54 to the interconnecting passage 84, which in turn is connected between lands 72 and 74 with the C3 apply passage 32. Thus, the friction device C3 will be engaged as well as the friction device C1 thereby establishing the transmission in the third forward speed ratio.

The operator will be aware that a malfunction has occurred since a shift from the first forward speed ratio to the third forward speed ratio will be noticeable. If the transmission is operating in the second through fifth forward speed ratios, the valve spools 46 and 68 are in the position shown in FIG. 4. When the malfunction occurs, as described above, all of the solenoid valves will be deenergized. On deenergization of the solenoids, passages 16 and 20 are pressurized. If the transmission is operating in fourth gear, the pressure distribution on the valve spools 46 and 68 does not change and the fourth speed ratio is maintained.

In the fifth speed ratio, the passage 16 becomes pressurized before the passage 38 can exhaust, and therefore the valve spool 68 will be retained in the latched position. If the transmission is operating in the second or third forward speed ratio, the feed passage 20 will be pressurized before the passage 38 can be exhausted and the spool valve 46 will be retained in the latched position.

Thus, it is seen that the transmission will operate in the fourth forward speed ratio if and electrical malfunction should occur whenever the transmission is operating in the second through fifth forward speed ratio. Obviously, if the electrical malfunction should be self-correcting, the transmission will resume normal operation. The transmission control can also be fabricated such that the passage 38 will be exhausted on electrical discontinuance prior to the pressurization of either passage 16 or 20. Under these conditions, the transmission will be conditioned for third forward speed operation should a malfunction occur during first, second or third forward speed ratio.

The transmission will remain in fifth ratio should an electrical malfunction occur, while the transmission is operating in either the fifth or sixth forward speed ratio. By providing selective orifices or restriction exhaust passages between passage 38 and the valve lands 56 and 78, the response of the valve spools 46 and 68 can be controlled during electrical power discontinuance to establish a variety of "limp home" capabilities.

The logic valve 18 will also provide protection for the transmission and engine from overspeeding in the event that a single solenoid should operate incorrectly due to either an electrical or a mechanical malfunction. The operating modes for various mechanical malfunctions are similar to those described above for electrical malfunctions. The logic valve 18 will prevent a downshift to the lowest ratio in the event of a malfunction occurring when the transmission is conditioned for any forward drive other than the lowest ratio.

Obviously, many modifications and variations of the present invention are possible in light of the above teaching. It is therefore to be understood, that within the scope of the appended claims, the invention may be practiced otherwise than as specifically described.

The embodiments of the invention is which an exclusive property or privilege is claimed are defined as follows:

1. In a transmission control system having a source of fluid pressure, a plurality of solenoid operated shift valve means which control a plurality of hydraulically actuated friction devices to selectively establish a plurality of forward speed ratios ranging from a lowest ratio to a highest ratio including a second highest speed ratio and a third highest speed ratio by controlling the flow of fluid from said source through said solenoid operated shift valve means, said solenoid operated shift valve means including two normally open valves; said control including logic valve means comprising: solenoid control means selectively actuatable for establishing a control pressure signal in said logic valve means for signaling the selection of a forward drive request; a pair of spool valve means each having a signal chamber which is pressurized in response to actuation of said solenoid control means for urging the spool valve means in one of two directions, spring means for urging the respective spool valve means in the other direction, and latching chamber means for urging respective spool valve means in said one direction, said latching chamber means of each spool valve means being in fluid communication with said source through respective ones of the normally open solenoid valves when said solenoid control means is actuated and the respective normally open solenoid valve is unactuated for maintaining said respective spool valve urged against said respective spring means when all said solenoid operated shift valve means become unactuated and said source continues to supply fluid to force the transmission to the second highest speed ratio from the highest speed ratio, to the third highest speed ratio from any of the two speed ratios immediately below or the second highest speed ratio immediately above the third highest speed ratio when all of the solenoid valves become unactuated and the source is continuing to supply fluid.

2. In a transmission control system having a source of fluid pressure, a plurality of solenoid operated shift valve means which control a plurality of hydraulically actuated friction devices to selectively establish a plurality of forward speed ratios ranging from a lowest ratio to a highest ratio including a second highest speed ratio and a third highest speed ratio by controlling the flow of fluid from said source through said solenoid operated shift valve means, said solenoid operated shift valve means including two normally open valve; said control including logic valve means comprising: solenoid control means selectively actuatable for establishing a control pressure signal in said logic valve means for signaling the selection of a forward drive request; a pair of spool valve means each having a signal chamber which is pressurized in response to actuation of said solenoid control means for urging the spool valve means in one of two directions, spring means for urging the respective spool valve means in the other direction, and differential latching chamber means for urging respective spool valve means in said one direction, said latching chamber means of each spool valve means being in fluid communication with said source through respective ones of the normally open solenoid valves when said solenoid control means is actuated and the respective normally open solenoid valve is unactuated for maintaining said respective spool valves urged against said respective spring means when all said solenoid operated shift valve means become unactuated due to electrical power discontinuance and said source continues to supply fluid to force the transmission to the second highest speed ratio from the highest speed ratio, to the third highest speed ratio from any of the third highest speed ratio and the second highest speed ratio immediately above the third highest speed ratio and to a ratio below the third highest ratio from any of the ratios below the third highest ratio when all of the solenoid valves become unactuated because of electrical power discontinuance and the source is continuing to supply fluid.

3. In a transmission control system having a source of fluid pressure, a plurality of solenoid operated shift valve means which control a plurality of hydraulically actuated friction device to selectively establish six forward speed ratios including a lowest speed ratio in a transmission by controlling the flow of fluid from said source through said solenoid operated shift valve means, said solenoid operated shift valve means including two normally open valves; said control including logic valve means comprising: forward solenoid control means selectively actuatable for establishing a control pressure signal in said logic valve means for signaling the selection of a forward drive request; a pair of spool valve means each having a signal chamber which is pressurized in response to actuation of said solenoid control means for urging the spool valve means in one of two directions, spring means for urging the respective spool valve means in the other direction, and differential area latching chamber means for urging respective spool valve means in said one direction, one of said spool valve having pressure area means connectible with a friction device for establishing the lowest speed ratio and a reverse ratio for holding the spool valve in the spring urged position when said friction device for establishing the lowest forward ratio is pressurized, said latching chamber means of each spool valve means being in fluid communication with said source through respective ones of the normally open solenoid valves when said solenoid control means is actuated and the respective normally open solenoid valve is unactuated for maintaining said respective spool valves urged against said respective spring means when all said solenoid operated shift valve means become unactuated due to electric power discontinuance and said source continues to supply fluid, to force the transmission to the fifth forward speed ratio from the sixth forward speed ratio, to the four forward speed ratio from any of the fourth and fifth forward speed ratios when all of the solenoid valves become unactuated and the source is continuing to supply fluid.

4. The invention defined in claim 3, wherein the logic valves are effective to force the transmission to the third forward speed ratio from any of the first, second and third speed ratios when a discontinuance of electrical power occurs and said source continues to supply fluid.

* * * * *